United States Patent [19]
Allen et al.

[11] Patent Number: 5,581,018
[45] Date of Patent: Dec. 3, 1996

[54] PNEUMATIC PLUG AND METHOD FOR HYDROSTATIC TESTING OF BATHTUB PLUMBING

[76] Inventors: Brian C. Allen, 460 Bella Vista Dr., Angwin, Calif. 94508; James D. Simpson, 13776 Meadow View La., Yucaipa, Calif. 92339

[21] Appl. No.: 447,625

[22] Filed: May 23, 1995

[51] Int. Cl.$^6$ .................................................. G01M 3/28
[52] U.S. Cl. ................................ 73/49.8; 138/90; 138/93
[58] Field of Search .......................... 73/49.8, 40.5 R, 73/40; 138/89.1, 90, 93, 95

[56] References Cited

U.S. PATENT DOCUMENTS

| | | | |
|---|---|---|---|
| 2,309,429 | 1/1943 | Ahern | 138/93 |
| 2,311,196 | 2/1943 | Ahern | 138/93 X |
| 2,678,666 | 5/1954 | Theis et al. | 138/93 |
| 2,753,876 | 7/1956 | Kurt | 138/93 X |
| 4,762,115 | 8/1988 | Penner | 138/93 X |
| 4,848,155 | 7/1989 | Huber | 73/49.8 |

*Primary Examiner*—Michael Brock
*Attorney, Agent, or Firm*—Natan Epstein

[57] ABSTRACT

An inflatable pneumatic plug useful for expediting the hydrostatic testing of bathtub and water plumbing installations. The pneumatic plug has a semi-rigid handle tube with an air valve at one end and an inflatable tube attached to its opposite end. The inflatable tube and the handle are of sufficiently small diameter to pass through the overflow drain in the bathtub, past the drain stopper assembly and into the drain trap without disassembly of the plumbing. The inflatable tube, such as a latex tube, is chosen with a length and wall thickness such that the inflatable tube is relatively stiff and will tend to deflect laterally around a solid obstacle when advanced into the plumbing rather than flattening axially. The inflatable tube is inflatable to a diameter at least five times greater than its deflated diameter for making a water-tight seal in a plumbing conduit.

13 Claims, 2 Drawing Sheets

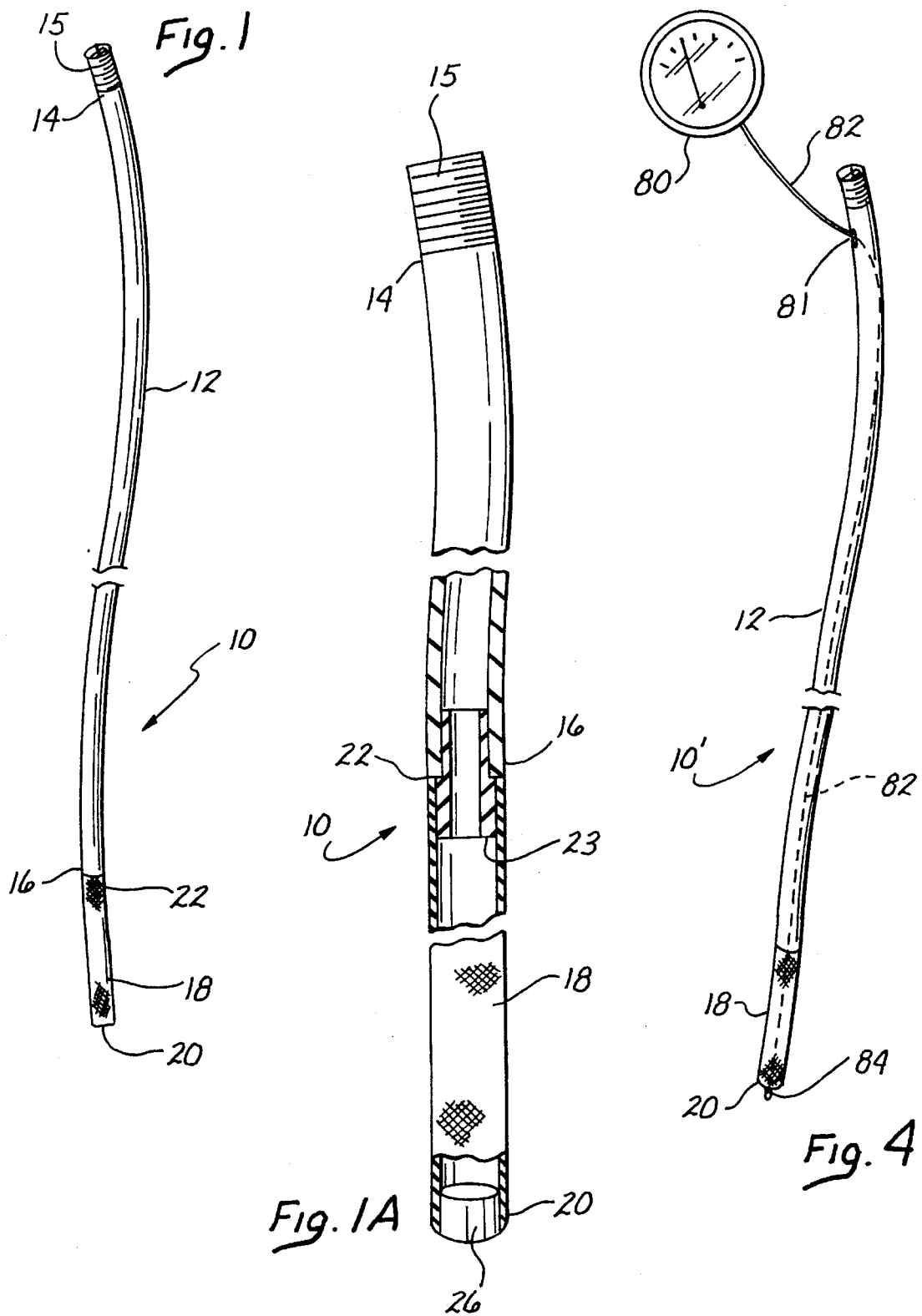

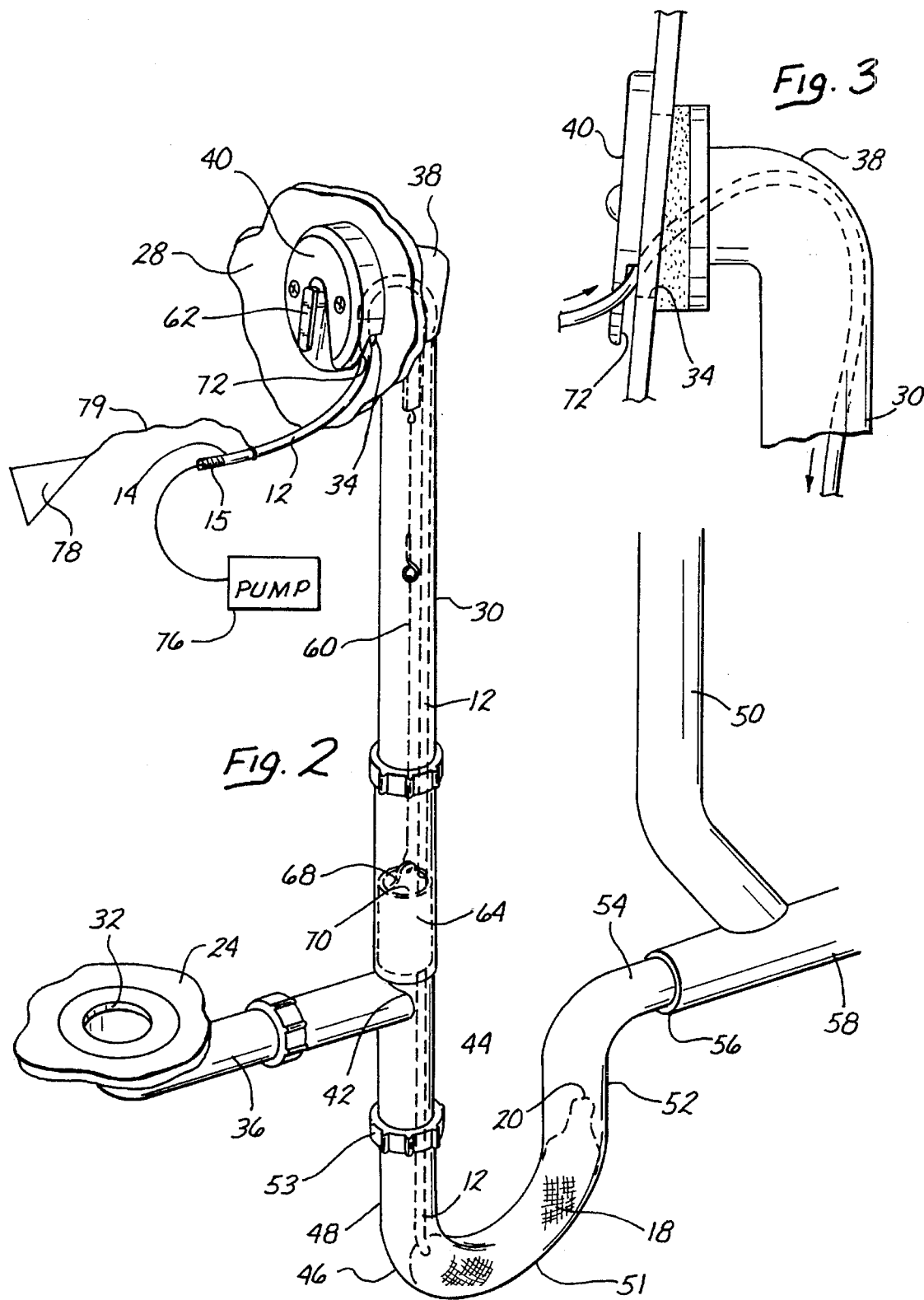

PNEUMATIC PLUG AND METHOD FOR HYDROSTATIC TESTING OF BATHTUB PLUMBING

FIELD OF THE INVENTION

This invention relates generally to the field of indoor plumbing and tools associated with installation and maintenance of the same, and more specifically concerns an inflatable seal for use in testing bathtub plumbing installations.

STATE OF THE PRIOR ART

Bathtub installations in new or renovated housing typically require testing to ascertain that no water leakage will occur in normal use of the bathtub. The bathtub itself is tested to ensure that the tub is water tight and that the drain and overflow pipe connections to the tub have been properly made so that water does not leak at the joints between these pipes and the tub. This test is conducted by filling the tub with water overnight or other sufficient period of time and observing whether visible leakage of water or a drop in the water level has occurred.

In addition the sewer and associated plumbing also must be tested for leaks. This procedure involves filling the sewer and vent lines with water for a period of twenty four hours and then checking whether the water level in the vent line has dropped or the hydrostatic pressure in the system has diminished.

Since the drain of the tub is normally connected by a P-trap to the general sewer and vent lines of the dwelling, the sewer and vent lines cannot be pressurized without the water backing up into the tub. For this reason the tub drain is disconnected from the sewer and vent lines by removing the P-trap, and both the tub drain and the sewer lines are capped at the resulting gap for the duration of the hydrostatic tests. After the test is completed the sewer can be drained of water but the bathtub must be emptied by bailing since the drain is capped. The plumbing crew must then return and make the connection of the tub drain to the sewer line. As presently conducted, hydrostatic testing of the water plumbing delays completion of construction and requires excessive skilled labor, both factors which increase the cost of the construction.

What is needed is a method and equipment for hydrostatic testing of water plumbing which will expedite the testing of bathtub installations and sewage lines and at the same time reduce the amount of labor required by the same.

SUMMARY OF THE INVENTION

This invention addresses the aforementioned need by providing an inflatable pneumatic plug useful for expediting the testing of bathtub and water plumbing installations. The novel pneumatic plug has a semi-rigid handle tube having a proximal end and a distal end, and an inflatable tube extending from the proximal end in fluidic communication with the handle tube. The length of the inflatable tube relative to its wall thickness is chosen such that in a deflated state the inflatable tube is relatively stiff and substantially self supporting in a horizontal direction when the handle tube is held horizontally. The inflatable tube is such that it will tend to bend and deflect laterally when its end is pressed against a solid object rather than flattening in an axial direction. The inflatable tube and the handle tube have approximately equal diameters in the deflated state of the inflatable tube, and the inflatable tube is inflatable to an inflated diameter at least five times greater than its deflated diameter for making a water-tight seal in a plumbing conduit. It is desirable that the inflatable tube be joined to the handle tube in a smoothly contoured joint without significant ridges. For example the handle tube and the inflatable tube may be of substantially equal external diameter and joined together at the proximal end of the handle tube by an internal coupling tube or splice, so that the joint is of diameter essentially equal to the handle tube and inflatable tube diameters.

An air valve may be provided at the distal end for admitting compressed air into the handle tube thereby to inflate the inflatable tube, and is actuatable for releasing compressed air for deflating the inflatable tube. In its deflated condition the inflatable tube may be a length of tubing of uniform diameter and in a preferred embodiment is inflatable to at least ten times its deflated diameter, although in other forms of the invention, the tube may be inflatable to at least eight times its deflated diameter. The inflatable tube may be a length of latex, silicone or other elastic tubing, and the handle tube can be of a semi-rigid grade nylon. For example, the latex tube is about 3/16 of an inch in diameter in its deflated state and is inflatable to at least two inches in diameter.

It is desirable to provide an indicator tag attached and hanging from the distal end to serve as a visual reminder of the presence of the pneumatic plug while the handle tube is inserted into a plumbing conduit.

A pressure gauge may be mounted to the handle tube at or near the distal end, and a pressure sampling conduit may extend the combined lengths of the handle tube and the inflatable tube, the sampling tube terminating in an open end forwardly of a proximal end of the inflatable tube for indicating on the pressure gauge the water pressure in a plumbing conduit sealed by the inflatable tube.

This invention also provides a novel method for hydrostatically testing a bathtub installation of the type having a tub drain, an overflow opening elevated above the drain, a vertical overflow conduit connecting the overflow opening to the drain and a P-trap conduit connecting the drain to a general sewer line. A trip lever assembly contained in the vertical overflow conduit is operative for moving a stopper in the vertical conduit for opening and closing the tub drain. The novel method comprises the steps of providing an pneumatic plug, inserting the plug through the overflow opening of the tub installation into the overflow conduit, advancing the deflated plug alongside the trip lever assembly and through the stopper down the vertical conduit past the drain and into the P-trap assembly. Compressed air is then supplied for inflating the plug to a diameter sufficient for making a watertight seal in the P-trap assembly, thereby to isolate the tub drain from the sewer line. Either or both the bathtub and the sewer line may then be filled with water for hydrostatic testing. Following testing, the water in the sewer and vent lines may be drained to the sewer outlet, after which the plug may be deflated to allow the tub water to drain into the sewer and the deflated plug is retrieved through the overflow opening of the bathtub.

These and other improvements, features and advantages of the present invention will be better understood by reference to the following detailed description of the preferred embodiments taken in conjunction with the accompanying drawings.

BRIEF DESCRIPTION OF THE DRAWINGS

FIG. 1 is a perspective view of a pneumatic plug according to this invention;

3

FIG. 1A is a side view partly

FIG. 2 is a perspective view illustrating a typical bathtub plumbing installation and showing in phantom lining the pneumatic plug positioned and inflated for hydrostatic testing of the bathtub and sewer line.

FIG. 3 is a side view of the elbow connection at the overflow opening of the tub;

FIG. 4 is a perspective view of an alternate form of the pneumatic plug equipped with a pressure gauge.

DETAILED DESCRIPTION OF THE PREFERRED EMBODIMENTS

With reference to the accompanying drawings, FIG. 1 shows the pneumatic plug of this invention, which is generally designated by the numeral 10 and has a handle tube 12 made of semi-rigid grade nylon with a distal end 14 and a proximal end 16. An inflatable tube 18 consists of a length of latex tubing which is sealed at a free end 20 and is joined in an air tight seal 22 to the proximal end 16. The joint 22 can be conveniently made by means of a coupler or splice tube 23 with one end inserted into the proximal end 16 of the handle tube and its opposite end inserted into the inflatable tubing 18, and secured with a suitable permanent adhesive. It is desirable that the outer surface of the joint 22 be smooth in a longitudinal direction of the pneumatic plug 10, without any abrupt transition in the diameter of the device so as not to create a shoulder which will tend to catch inside plumbing and prevent the device from smoothly threading into and out of the tub plumbing. The free or proximal end 20 of the inflatable tubing is sealed closed, for example by inserting an end plug 26 fixed in place with adhesive. A stem valve 15, such as a conventional bicycle tire valve, is provided at the distal end 14 of the handle tube 12. The stem valve 15 can be attached to an air pump, for example either a hand operated or a foot operated air pump of the type commercially available for inflating bicycle tires.

The inflatable tube 18 is made of latex tubing having a 3/16 inch outside diameter and 1/64 inch wall thickness. Such latex tubing is inflatable at an air pressure of between 20 to 30 PSI (Pounds per Square Inch) to an inflated diameter of over two inches, an increase of more than ten times over its deflated diameter. The handle tube 12 is black semi-rigid grade nylon tubing of 3/16 inch outside diameter, 0.107 inch inside diameter and a wall thickness of 0.040". Such nylon tubing is rated at a working air pressure of 875 PSI at 70° F.

FIG. 2 illustrates a typical bathtub plumbing installation where the tub itself has been broken away for clarity of illustration. Only two small fragments of the tub are shown in FIG. 2, a portion of the tub bottom 24, and a fragment of the vertical end wall 28. The tub bottom 24 has a drain opening 32, and the end wall has an overflow opening 34. The drain 32 opens into a horizontal drain pipe 36. A ninety degree elbow 38 connects overflow opening 34 to the upper end of a vertical overflow pipe 30, the lower end of which joins the drain pipe in a right angle joint 42, from where a vertical drain segment 44 connects to one end of a P-trap 46. The P-trap is a length of pipe bent into a U-shape with one upright arm 48 of the U connected to the bottom end of the drain pipe 44, and the other arm 52 of the U bent to a horizontal end 54 which connects into the end 56 of a sewer line 58. In normal use of the bathtub, some tub water is trapped remains in the U-shaped bottom of the P-trap and keeps the sewer from venting into the bathroom through the tub openings. Typically, a vent line 50 is connected to the sewer line 58. The vent line normally rises the height of the house or building and its upper end opens to the atmosphere, usually above the roof top of the dwelling.

A coverplate 40 mounted to the tub wall 28 over the overflow opening 34 carries a flip lever 62 which is connected through a linkage 60 to a cylindrical stopper 64. The outside diameter of the stopper 64 makes a close sliding fit inside the vertical conduit 30, and the stopper is normally supported by the linkage 60 above the joint 42. When it is desired to fill the tub with water, the lever 62 is manually lifted or flipped up, which causes the linkage 60 to lower the stopper 64 into alignment with the joint 42, thereby closing the opening of the drain line 36 at the joint 42 to prevent water from draining out of the tub. The mechanism of the lever 62 and linkage 60 are well known and readily commercially available, and do not need to be illustrated and described in greater detail here. For purposes of this disclosure, it is sufficient to understand that the stopper 64 is a hollow cylinder open at both its upper and lower ends. Its open upper end is diametrically divided by a transverse plate 68 of sheet metal, leaving semi-circular openings 770 on either side of the plate into the interior of stopper 64.

The pneumatic plug 10 is used for purposes of this invention by inserting the free end 20 of the inflatable tubing 18 into the overflow opening 34 of the tub, and advancing the tubing 18 into the overflow pipe 30.

The latex tubing 18 is characterized by substantial resistance to flattening in an axial direction of the tubing, while being readily flexible in a transverse direction of the tubing. That is, the latex tubing 18 can withstand a moderate load in an axial direction without axial collapse of the tubing wall, in contrast for example to a soft walled balloon which yields readily in any direction when pressed against a solid object. The load resistance in an axial direction of the latex tubing is considerably greater than its resistance to flexing in a direction transverse to its axis. The length of the inflatable tube 18 relative to its wall thickness is chosen such that in a deflated state the inflatable tube is relatively stiff and substantially self supporting tending to hold a generally straight horizontal position when the handle tube is held horizontally. However, the inflatable tube 18 is such that it will tend to bend and deflect laterally when it end is pressed against a solid object rather than flattening in an axial direction. In other words the inflatable tube 18 is made of a highly elastic material and the length of the tube is relatively short with a wall thickness such as to give the tube substantial stiffness or rigidity along its longitudinal direction, yet with the ability to resiliently bend or flex laterally. The inflatable tube when inserted into the tub plumbing as shown in FIG. 2 will tend to resiliently deflect sideways when encountering obstructions with its free end 20 as the tube 18 is advanced along the linkage mechanism 50 and into and through the stopper 64, resiliently seeking a path around such obstructions and threading itself into and through the plumbing. This characteristic of the latex tubing 18 allows it to be threaded upwardly through the overflow slot 72 in the coverplate 40 and to be deflected through a 180° bend against the interior surface of the 90° elbow 38 and into the overflow pipe 30 simply by urging the latex tubing into the overflow slot, as shown in FIGS. 2 and 3. Once the entire length of latex tubing 18 is so inserted through the overflow opening 34 and into the overflow pipe 30, the nylon tubing 12 is advanced into the slot 72 and similarly follows into the overflow pipe 30. The nylon tubing urges the latex tubing downwardly along the vertical pipe 30 as the nylon handle tube 12 is gradually fed into the overflow opening 34. The latex tube 18 moves alongside the linkage 60 and enters the open top of the stopper 64 on one side or the other of the transverse plate 68. Under continuing downward urging the free end 20 of the latex tube 18 then passes through the interior of the cylindrical stopper 64 and out its open bottom, then down into the curved bottom 51 of the U-shaped P-trap 46. The inflatable tube is properly positioned when it lies along the bottom portion 51 of the P-trap, although its precise positioning is not critical so long as the inflatable tube 18 is somewhere in the P-trap and below the joint 58 of the P-trap with the vertical drain segment 44.

Compressed air is then fed by an air pump 76 (schematically indicated in FIG. 2) connected to the valve 15 and through the handle tube 12 into the latex tube 18 until the inflatable tube 18 balloons to an inflated diameter sufficient to make a water-tight seal in the P-trap 46 as indicated in phantom lining in FIG. 2. When the inflatable tube is sufficiently inflated, the air pump 76 may be disengaged from the air valve 15 which then retains the compressed air in the pneumatic plug 10. Hydrostatic testing of the tub and the sewer/vent lines 58, 50 can now be carried out simultaneously without interference between the two tests. The tub and the sewer/vent lines 58, 50 may be both filled with water to check for leaks on the tub side as well as on the sewer line side of the ballooned latex tubing 18. This leak testing of the tub and the sewer/vent lines is run for a sufficient period of time, typically about twenty four hours, after which the water level in the tub and in the sewer/vent lines is checked, with a drop in either one being indicative of a leak which must be found and sealed.

After the test is complete, the sewer/vent lines 58, 50 are drained into the sewer serving the particular dwelling or building, and the ballooned tube 18 is then deflated by opening the air valve 15. This allows the tub water to drain normally through the tub drain 32 and P-trap 46 into the sewer line 58. The pneumatic device 10 is retrieved from the plumbing simply by pulling on the handle tube 12 at the distal end 14 protruding from the slot 72 until the latex tube 18 is removed from the drain opening 30.

As a reminder to the plumbing crew, it is desirable to attach a flag or tag 78 by means of a nylon or similar line 79 to the distal end 14 of the handle tube 12 so that the flag 78 hangs from the end of the handle tube 12 into the tub. The flag 60 is of a bright color, such as day-glow orange, to catch the attention of the plumbing personnel, and is easily visible to anyone working in the vicinity so that the pneumatic plug 10 is not forgotten inside the plumbing.

In one form 10' of the invention illustrated in FIG. 4, a pressure gauge 80 can be provided at the distal end of the handle tube 12 and connected to a sampling tube 82 running through the interior of the handle tube 12 and inflatable tube 18. The sampling tube 82 may be nylon tubing 1/16 inch outside diameter and 1/32 inside diameter, entering the nylon tube 12 at an entry opening 81, passes through the coupler tube 23 shown in FIG. 1A and through an opening defined axially in the end plug 26 to protrude slightly beyond the free end 20 of the latex tube as shown in FIG. 4. The entry opening 81 and the axial opening in the plug 26 are both sealed to contain pressurized air in the tube 12 and the latex tube 18. The protruding proximal end 84 of the sampling tube 84 is open forwardly of the free end 20 of the latex tube 18. When the pneumatic device is inserted into the tub plumbing as in FIG. 2 the pressure gauge 80 remains outside the overflow slot 72 where its pressure indication can be easily seen by the plumbing crew. When the latex tube 18 is inflated in the P-trap 46 the open end 84 of the sampling tube 82 keeps the pressure gauge 80 in fluidic communication with the sewer line 58 so that hydrostatic pressure in the sewer/vent plumbing can be conveniently seen by the plumbing crew on the display of the pressure gauge 80, so that a leak in the sewer/vent line system can be detected by a drop in pressure indicated by the gauge.

The device 10 of this invention allows the bathtub installation to be fully tested after all the tub plumbing has been installed and connected, resulting in considerable savings of time and labor. No capping of the tub and sewer lines is required and the plumbing crew does not need to return to complete the installation after the testing, making for smoother and more efficient progress of the construction with resultant economic benefit.

While certain preferred embodiments of the invention have been described and illustrated for purposes of clarity and example, it must be understood that many changes, substitutions, and modifications to the described embodiments will become obvious to those possessed of ordinary skill in the art without thereby departing from the scope and spirit of the present invention which is defined by the following claims.

What is claimed is:

1. A pneumatic plug for testing plumbing, comprising:
a semi-rigid handle tube having a proximal end and a distal end, an inflatable tube extending from said proximal end in fluidic communication with said tube, said inflatable tube in a deflated state being substantially resistant to flattening in an axial direction but resiliently flexible in a transverse direction, said inflatable tube and said handle tube having approximately equal diameters in said deflated state, said inflatable tube being inflatable to an inflated diameter at least five times greater than its deflated diameter.

2. The plug of claim 1 further comprising air valve means at said distal end for admitting compressed air thereby to inflate said inflatable tube or alternatively actuatable for releasing compressed air for deflating said inflatable tube.

3. The plug of claim 1 wherein said inflatable tube is inflatable to an inflated diameter at least eight times its deflated diameter.

4. The plug of claim 1 wherein said inflatable tube is of substantially uniform deflated diameter.

5. The plug of claim 1 wherein said inflatable tube is a length of latex tubing.

6. The plug of claim 1 wherein said handle tube is of semi-rigid nylon.

7. The plug of claim 1 further comprising an indicator tag attached to said distal end so as to hang from said handle tube and serve as a visual reminder of the presence of the plug when said handle tube is inserted into a plumbing conduit.

8. The plug of claim 1 further comprising a pressure gauge mounted to said handle tube at or near said distal end and a pressure sensing conduit extending the length of said handle tube and said inflatable tube, said sensing conduit terminating in an open end forwardly of a proximal end of said inflatable tube for indicating on said gauge air pressure in a plumbing conduit sealed by the inflatable tube.

9. The plug of claim 1 wherein said inflatable tube is joined to said handle tube at a joint of diameter approximately equal to said approximately equal diameter.

10. The plug of claim 1 wherein said approximately equal diameter is no greater than about three sixteenths of an inch.

11. The plug of claim 1 wherein said inflatable tube is about three sixteenths of an inch in diameter in said deflated state and is inflatable to at least two inches in diameter.

12. A pneumatic plug for testing plumbing, comprising:
a semi-rigid handle tube having a proximal end and a distal end, a length of elastic tubing sealed at a free end and secured at an inner end by air tight engagement to said proximal end, said elastic tubing characterized by substantial resistance to axial compression but being flexible in a transverse direction, said elastic tubing being inflatable to an inflated diameter at least six times greater than its deflated diameter, and an air valve at said distal end for admitting compressed air for inflating said elastic tubing through said handle tube wherein said semi-rigid handle tube and said elastic tubing both have a diameter of approximately three sixteenths of an inch.

13. The plug of claim 12 wherein said length of elastic tubing is latex tubing.

* * * * *